Nov. 15, 1960 G. E. NELSON 2,960,662
WIDE RANGE SIGNAL LEVEL TRANSFER CIRCUIT
Filed July 8, 1958
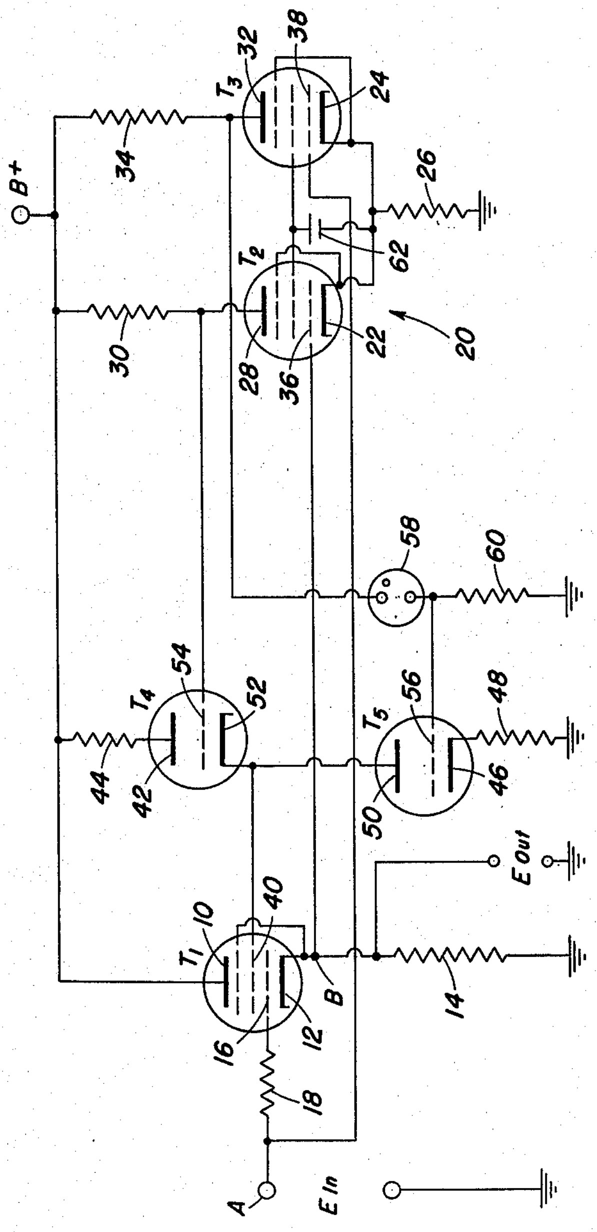
INVENTOR
Gordon E. Nelson
BY Eldon H. Luther
ATTORNEY United States Patent Office 2,960,662

Patented Nov. 15, 1960

2,960,662

WIDE RANGE SIGNAL LEVEL TRANSFER CIRCUIT

Gordon E. Nelson, Windsor, Conn., assignor to Combustion Engineering, Inc., New York, N.Y., a corporation of Delaware Filed July 8, 1958, Ser. No. 747,237

6 Claims. (Cl. 330—128)

This invention relates to a signal level transfer circuit that is operative over an extremely wide range of signal voltages with little error in the transfer with the invention relating more particularly to a cathode follower circuit that has an extended range of operation.

The invention enables the cathode follower to have an extended range of operation and at the same time enables the cathode resistor to be reduced to a low value in order to minimize the effect of the load variation on the output voltage. This wide range operation is obtained by employing a difference amplifier, the inputs to which are the cathode voltage and the signal input of the cathode follower, respectively. The outputs of this difference amplifier are impressed upon the grids of a pair of cascoded amplifiers in a manner such that the voltage on the interconnected plate and cathode of these tubes shifts so that by impressing this voltage on a supplemental grid of the cathode follower which is located between the control grid and plate thereof (which grid may be the screen of a pentode) the cathode is made to follow the input signal of the cathode follower through an extremely wide range of signal voltages.

It is an object of this invention to provide an improved signal level transfer circuit of the cathode follower type and which is operable over an extremely wide range of signal voltages.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein the single figure is a circuit diagram of the invention.

Referring now to the drawing wherein like reference characters are used throughout to designate like elements, the illustrative and preferred embodiment of the inventive organization illustrated therein comprises a cathode following tube T–1 which is a pentode having its plate 10 connected with the B+ supply and its cathode 12 connected to ground through the cathode output resistor 14. The input signal E-in appearing at point A is impressed upon control grid 16 of T–1 through resistor 18 which is the connection between the input A, and the grid 16, the purpose of resistor 18 being to permit point A to move in a positive direction relative to the cathode without loading the input since this resistor will maintain the grid current at a small value. Any difference in potential between point A, the signal input, and point B, the cathode of T–1, is amplified by difference amplifier 20. This difference amplifier comprises pentodes T–2 and T–3 the cathodes 22 and 24 of which are connected to ground through resistor 26 while plate 28 of T–2 is connected to B+ through resistor 30 and plate 32 of T–3 is connected to B+ through resistor 34. The control grid 36 of T–2 is connected with and accordingly varies with point B while control grid 38 of T–3 is connected with point A. Thus as point A tends to become less positive than B the voltage on plate 32 would increase (due to drop in plate current) relative to that on plate 28 with the voltage difference between these plates being amplified relative to that of points A and B.

This difference in voltage between plates 28 and 32 is utilized to control the voltage on screen 40 of the cathode follower tube T–1 and for this purpose a pair of amplifier tubes T–4 and T–5 are connected in cascode with T–4 having its plate 42 connected to B+ through resistor 44, T–5 having its cathode 46 connected to ground through resistor 48 and plate 50 of T–5 and cathode 52 of T–4 being interconnected. Grid 54 of T–4 is connected to plate 28 of T–2 and grid 56 of T–5 is connected to plate 32 of T–3 with this latter interconnection through a voltage reference 58 which is employed to drop the D.-C. potential from the plate of T–3 to the grid of T–5 to enable this grid to operate at a lower D.-C. quiescent level without introducing a loss in gain in the system as would be the case if resistor network voltage division were used. The voltage reference 58 is connected to ground through resistor 60.

In order to extend the range of linear operation of tubes T–2 and T–3 a bias battery 62 is placed between the cathodes and the screens of these tubes.

This circuit functions to maintain point A and point B at the same potential level over a wide range of input signal. Any difference in potential between A and B results in a change in voltage of screen 40 such as to reduce this difference to a minimum. For low signal value point A will tend to become less positive than B due to the fact that the operating point, or quiescent level is moving down the load line towards the cutoff. Therefore B will become more positive than A. This results in control grid 36 of T–2 rising to a higher value than the control grid 38 of T–3 is differential amplifier 20. The voltage of plate 28 will fall while that of plate 32 will rise, resulting in a decrease in voltage at grid 54 of T–4 and an increase in voltage at grid 56 of T–5. This results in a proportionally larger voltage drop across T–4, shifting the plate 50 and cathode 52 of these tubes down and accordingly shifting screen 40 down such as to reduce the cathode current in T–1 and consequently the cathode voltage to a point very near its grid voltage.

If point A is increased to a value more positive than the cathode (this having little effect on cathode 12 because of the action of resistor 18 and because of the relatively high grid and cathode conductance which maintains the grid and cathode potential nearly the same) this increase in point A relative to B causes control grid 38 of T–3 to become more positive than control grid 36 of T–2, resulting in decreasing the voltage of plate 32 and increasing the voltage of plate 28. Thus grid 54 of T–4 will rise and grid 56 of T–5 will fall, thereby shifting the voltage of plate 50 and cathode 52 upward and accordingly increase the voltage of the screen 40 resulting in increasing the cathode current of T–1 which in turn raises its cathode potential to a value very near that at point A.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. In an organization of the type described a cathode follower tube having a supplemental grid intermediate the control grid and the plate, means responsive to a difference in potential between the control voltage and the cathode effective to adjust the voltage of said supplemental grid in a manner to change the cathode current of the cathode follower so as to bring the cathode potential and the control voltage into substantial agreement, said means including a difference amplifier connected to amplify any difference between the control voltage and the voltage of the cathode and means responsive to the output of the voltage difference amplifier operative to produce a voltage that varies in sense in accordance therewith and which is applied to said supplemental grid.

2. The organization of claim 1 wherein the means responsive to the output of the voltage difference amplifier comprises a pair of amplifiers in cascode across a potential with the supplemental grid connected with the interconnection of these amplifiers and with the outputs of the difference amplifier providing the control signal for this pair of amplifiers.

3. A cathode follower circuit operable over a wide range comprising in combination a cathode follower tube having supplemental grid intermediate the control grid and the plate, means for regulating the voltage on said supplemental grid to maintain the input signal voltage and the cathode voltage generally the same over a relative wide range, said means including a difference amplifier having two amplifiers connected across a potential with the input of one being the cathode voltage and input of the other being the signal input to the cathode follower and a pair of amplifiers connected in cascode with the input of one nearest the positive voltage source connected to receive the amplified output signal of said one of the difference amplifiers and the input of other connected to receive the amplified output signal of said other of said difference amplifiers, said supplemental grid being connected with the interconnection of the amplifiers connected in cascode.

4. The organization of claim 3 wherein the cathode follower tube comprises a pentode the screen grid of which is the supplemental grid.

5. The organization of claim 3 including a high resistance in the control grid circuit to permit the control grid to become positive relative to the cathode without loading the signal source.

6. A wide range signal level transfer circuit comprising a cathode follower connected across a potential and having a screen grid, a resistor interconnecting a signal source and the control grid of the follower tube, a pair of amplifier tubes connected across a potential in a manner so that they form a difference amplifier with the control grid of one having the input signal of the cathode follower impressed thereon and the control grid of the other having the cathode voltage of the follower impressed thereon whereby the output of these tubes varies with these respective voltages, a pair of amplifier tubes connected in cascode across a potential with the output of said one of difference amplifier tubes coupled to the grid of the tubes of this latter pair of tubes that is nearest the negative side of the potential and the output of said other of the difference amplifier tubes coupled to the grid of the other of said latter pair of tubes, and the voltage of the interconnected plate and cathode of said cascoded pair coupled to the screen of the cathode follower.

References Cited in the file of this patent

UNITED STATES PATENTS 2,769,089 Neumann et al. ---------- Oct. 30, 1956